United States Patent Office 2,923,148
Patented Feb. 2, 1960

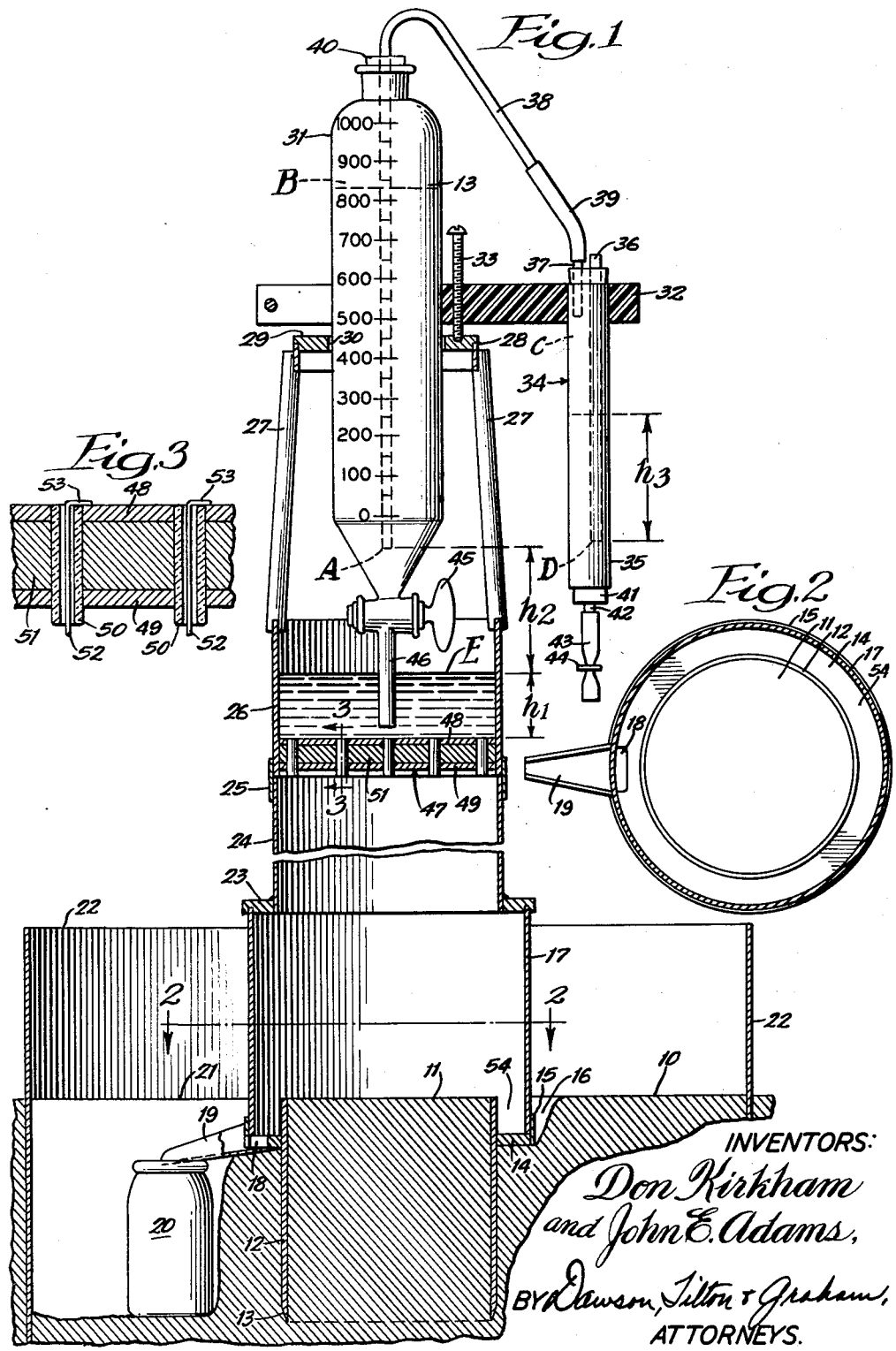

2,923,148

APPARATUS FOR MEASURING ERODIBILITY, RUN-OFF, INFILTRATION AND OTHER PHYSICAL PROPERTIES OF SOIL IN PLACE

Don Kirkham, Ames, Iowa, and John E. Adams, Temple, Tex., assignors to Iowa State College Research Foundation, Inc., Ames, Iowa, a corporation of Iowa Application October 15, 1956, Serial No. 615,990

8 Claims. (Cl. 73—86)

This invention relates to an apparatus for measuring certain physical properties of soil and like materials. More specifically, the invention is concerned with apparatus for measuring the susceptibility of soil to erosion by the beating action of the rain thereon, for measuring the infiltration thereof, for measuring also the run-off of the rain water, and for measuring other such physical properties, all while the soil is in place within the ground. It will be apparent that the invention is useful in making such measurement determinations, as air permeability and hydraulic conductivity for example.

Most rainfall simulators previously described in the literature have been large and bulky and have been either designed to be used in a fixed position in the laboratory or to be set up over a rather large plot in the field; several persons have been required to set them up and operate them. These factors have made investigations with rainfall simulators expensive and limited to specialized studies. We describe herein a small, economical, portable rainfall simulator, with associated equipment, for measuring infiltration, run-off, susceptibility to erosion and other physical properties of soil in place. The apparatus can be carried, installed and operated by one person.

An object of this invention is to provide apparatus for measuring the susceptibility of soil and like materials to splash and run-off erosion and other physical properties thereof, such as infiltration rate and run-off rate. Another object of the invention is to provide an apparatus for making such measurements wherein the susceptibility to erosion, run-off and infiltration rate can be reduced to standard terms based on rainfall intensity, soil area and soil quantity, etc., with the result that these measurements may be utilized in characterizing the soil. Still another object is in the provision of apparatus useful in the making of measurements such as those described wherein a rainfall of predetermined intensity is simulated by the controlled water deposition on a selected soil test sample. Yet another object is that of providing apparatus wherein a soil test sample is defined by an infiltration cylinder driven into the soil, and wherein water is dropped onto this test sample through a raindrop applicator having the characteristic of depositing water in the form of raindrops on the soil sample defined by the infiltration cylinder, and in which water is delivered to the raindrop applicator from a reservoir maintaining the same under a predetermined pressure head.

Still a further object is in the provision of an apparatus for measuring soil susceptibility to erosion, run-off rate and infiltration rate characterized by simulating a rainfall of predetermined intensity on a soil test sample for a preselected unit of time, collecting the material worn away or eroded by such deposition and collecting also the run-off water, and measuring the run-off water and eroded soil whereby the various measurements may then be reduced to intelligible terms. Additional objects and advantages will appear as the specification develops.

An embodiment of the invention is illustrated in the accompanying drawing, in which—

Figure 1 is a vertical sectional view taken through apparatus embodying the invention; Figure 2 is a transverse sectional view taken along the line 2—2 of Figure 1; and Figure 3 is a vertical sectional view taken on the line 3—3 of Figure 1.

The apparatus is useful, as has been brought out, in making various physical measurements, or measurements of certain physical properties, of soil; and it will be apparent that it could also be utilized in making similar measurements of materials having characteristics approaching those of soil. In the illustration given, the apparatus is shown in use in making tests of a sample of soil while that sample is in its environmental surrounding—that is, the apparatus is useful in field applications. The entire soil body or the ground is designated in Figure 1 with the numeral 10.

The sample under test is designated with the numeral 11, and is provided or defined by driving into the ground 10 the infiltration cylinder or tube 12 having a beveled lower end 13 forming an edge that facilitates the penetration of the cylinder into the ground. In the specific illustration, the bevel 13 has an angle of approximately 18°, and the cylinder is driven into the ground preferably by an impact member and plate combination whereby the sample 11 is relatively undisturbed. It is important that the upper edge of the infiltration cylinder be level, and this can be established by employing an ordinary level and making suitable tests from time to time as the cylinder is driven into the ground.

Extending laterally outwardly from the cylinder 12 is a horizontal trough plate 14 soldered or otherwise secured thereto. As is apparent from Figure 1, the plate 14 is near the upper end of the cylinder 12 and the plate's outer edge is equipped with an upwardly extending guide ring 15. It will be appreciated that in order to permit the infiltration cylinder to be driven completely into the ground, a portion of the ground thereabout must be removed to accommodate the trough plate 14, and in the drawing the channel thus defined by the removed material is designated with the numeral 16. Extending upwardly from the trough plate 14 and received within the ring 15 is a splash shield 17 that preferably has a height of approximately twelve inches, although the specific height thereof is not critical. The splash shield, as will be described later, collects soil and water etc. that is splashed upwardly and outwardly during the test measurements.

The trough plate 14 at any selected position thereon is provided with an aperture or opening 18 therein, and secured to the plate and guide ring 15 under such opening is a run-off spout 19 adapted to drain material into a collector bottle 20 positioned therebelow. Again, it is seen in Figure 1 that a quantity of earth must be removed so as to accommodate the run-off spout and collector bottle, and the hole or large recess dug for that purpose is designated for identification with the numeral 21. If desired, a sheet metal ring 22 which is to be concentric with and which surrounds the entire structure may, after insertion of the cylinder 12, be driven into the ground 10 for receiving water from a supply (not shown) to pre-soak the soil to the so-called "field capacity" moisture content or other degree of wetness. The depth to which the ring 22 is driven is not critical.

The splash shield 17 is removably carried by the trough plate 14 and guide ring 15, and is positioned as shown after the infiltration cylinder has been driven in place within the ground 10 to define the test sample 11. At its upper end the splash shield is equipped with an annular ring 23 that is soldered or otherwise secured along its inner perimetric edge to an upwardly extending wind shield 24 equipped at its upper end with a guide ring 25 adapted to receive a supply tank 26 therein and having affixed thereto at its upper end certain support members 27, two of which are indicated in the figure at 180° angular separation, though actually three supporting members at 120°, constituting a tripod, are used. The supports 27 are recessed along the inner surfaces thereof at their upper ends to receive the annular support ring 28 that is secured to and carries a support platform 29 having a central opening 30 therein. Extending through that opening is a tank or reservoir 31 that may be of any suitable type, and in the illustration given is a one liter graduated cylindrical separatory funnel that has ten milliliter subdivisions. The reservoir is transparent and may be formed of glass so that the volume of water therein at any time is readily ascertained by a visual inspection.

The reservoir 31 is carried by a holder 32 that may be plastic as shown, and which has preferably a bifurcated end portion communicating with an opening therethrough which permits the reservoir to be inserted into the opening readily and that, by means of a conventional nut and bolt arrangement, permits the bifurcated end to be drawn together to anchor the reservoir securely within the holder to within coarse adjustment at a desired vertical height. The holder 32 may be raised or lowered in fine adjustment by three screws 33 at 120° angular separation, only one of which is shown. The coarse and fine vertical adjustment is useful in connection with regulating a head of water in the supply tank 26 about which more will be said later. Also, the holder 32 is apertured, laterally of the opening therethrough receiving the reservoir, to receive a pressure head regulator that is designated generally with the numeral 34 and which comprises an elongated tube 35 closed at its upper end with a cork or other suitable stopper that provides access to the interior of the tube for an air tube 36 and for a short tube 37 which may be coupled to the inclined, bent connector tube 38 by a rubber tube section 39 in a manner well known.

The tube 38 communicates with the interior of the reservoir 31 through a stopper 40. The lower end of the pressure head regulator tube 35 is closed by a stopper 41 having a rigid tube 42 depending therefrom which is connected with a collapsible or flexible rubber tube 43 that can be pinched off or closed by a clamp or clip 44. The lower end of the reservoir 31 is equipped with a stop cock 45, equipped in turn with a short delivery tube 46. The stop cock 45 is not used to control the flow of water from the reservoir. The flow of water from the reservoir 31 is controlled by means of the pressure head regulator 34, the operation of which is described below.

Positioned just below the delivery tube 46, and at the lower end of the supply tank 26, is a raindrop applicator that is designated generally with the numeral 47. The applicator 47 comprises a pair of spaced apart upper and lower plates 48 and 49 that are secured to the walls of the supply tank 26 and extend transversely thereacross in parallel relation. The plates 48 and 49 are provided with a plurality of apertures therethrough, and in the specific illustration given the apertures in the plates are arranged in concentric circles, one-half inch apart, the diameter of the holes is one-fourth inch, and there are one hundred holes in number.

The holes in the top and bottom plates 48 and 49 are in axial alignment so as to receive the applicator tubes 50 that are preferably glass capillary tubes having an outer diameter of one-fourth inch and bore of about .050 inch. The tubes 50 are flush with the upper surface of the plate 48 and extend slightly below the bottom surface of the plate 49. The tubes 50 are held in place by a filler material 51 that completely fills the space between the plates 48 and 49, and while a number of different materials may be employed, Castolite was used and was found convenient to work with for it may be poured while in liquid form into the space between the plates, and thereafter hardens to rigidly anchor the delivery tubes 50 in place.

The tubes 50 in the specific illustration were selected by means of a separate testing operation (in equipment not shown) so as to provide a water delivery rate of five drops per 20 to 25 seconds with a pressure head of 6¾ inches of water. Extending downwardly through each of the delivery tubes 50 is a wire 52 which is substantially coaxial with the tube, and at its upper end has a laterally turned portion 53 which supports the wire in depending relation through the tube. The wire 52 may be Chromel "A" having a diameter of 0.035 inch when the bore of the applicator tubes 50 is 0.047 inch. The wires 52 cause the water flowing downwardly through the tubes 50 to fall as drops and are employed for that purpose since the entire structure 47 is to serve as a raindrop applicator.

In use of the apparatus, it is installed as shown in the drawing with the splash shield 17 and all of the structure thereabove placed in position after the infiltration cylinder 12 has been driven into the ground to define a soil test sample. The reservoir 31 is filled with water usually to the 1,000 milliliter level. Next, the pressure head regulator 34 is adjusted, by filling it with water to a proper depth, to provide and maintain when the stopcock 45 is open a constant head of water, usually about one inch above the plate 48, in the supply tank 26. This constant one inch head of water stands also over the tops of the applicator tubes 50 and hence this head forces water through the tubes 50 at a constant rate to the underside of the bottom plate 49 as raindrops that fall downwardly through the wind shield 44 and onto the test sample 11 aligned therebelow, at a constant rate. It should be appreciated that the water delivery rate must be known, and the length of time for which a test is conducted must also be known. Therefore, the water delivery or water application to the test sample is carefully timed. The presetting of the pressure head regulator so that the proper rainfall rate will be delivered is, of course, not done with the raindrop applicator over the test sample 11, but over a convenient position to the side where the artificially produced raindrops will not disturb the sample of soil 11 subsequently to be tested. It is to be remarked in this connection that the raindrop applicator 47 and all of the equipment above it, including the supply tank 26, reservoir 31 and pressure regulator 34—all as one unit, is removable from the wind shield 24 for the purpose of precalibrating the raindrop rate. It has already been mentioned that the screws 33 aid in the fine control of the head adjustment.

From the supply tank 26, water drops are falling at a steady rate under an equilibrium head $h_1$ shown in Figure 1. A vertical tube 36 in the pressure head regulator is open to atmosphere at its upper end. In order to maintain the head $h_1$, water must be supplied from the reservoir 31 into the supply tank 26. As water leaves the reservoir, a partial vacuum is created in an air space B at the top of the reservoir. This vacuum causes water, which originally stood in the left arm of the glass tubing 38 to the height of the air space B, to be sucked down to point A where the air which follows the falling water is sucked into the reservoir 31 and rises as bubbles (not shown), up to the air space B to relieve the vacuum. As air flows from glass tubing 38 down to A and bubbles up to the air space B, a partial vacuum is created in the glass tubing 38, and hence, a partial vacuum is also created in an air space C in the pressure head regulator. The vacuum in C causes water which originally stood in tube 36 to the same height as in the pressure head regulator 34, to be pulled down to point D at the base of tube 36, causing air to be sucked into the water of the pressure head regulator and to rise as air bubbles (not shown) up to air space C (the air then flowing to A and bubbling up to B, permitting water to leave the water reservoir 31 to maintain the head $h_1$).

At dynamic equilibrium the water in the pressure head regulator stands to height $h_3$ above the point D. To determine how $h_2$ and $h_3$ and hence how $h_1$ are related, we proceed as follows:

At equilibrium the pressure $P_E$ at E, the level of the water in the supply tank and in the tube 46 (if $P_A$ is the pressure at point A, $d$ the density of the water and $g$ the acceleration of gravity) is given by $$P_E = dgh_2 + P_A$$

At point D the pressure $P_D$ is, if $P_C$ is the pressure at C, given by $$P_D = dgh_3 + P_C$$

But $P_E$ and $P_D$ are both atmospheric pressure so that $P_E = P_D$; that is $$dgh_2 + P_A = dgh_3 + P_C$$

Furthermore, since dynamic pressure losses of air as it moves through the glass tubing 38 are negligible, we have $P_A = P_C$. Therefore, $$dgh_2 = dgh_3$$

or $$h_2 = h_3$$

The last equation, although showing how $h_2$ is related to $h_3$, does not show how $h_1$ is related to $h_2$ and $h_3$. It will be observed from Figure 1, however, that if $h_3$ is decreased, $h_1$ will rise; for otherwise, $h_2$ would not stay equal to $h_3$ as demanded by the physical situation. Thus, decreasing $h_3$ decreases $h_2$ and hence increases $h_1$—and vice versa. In view of the equation $h_2 = h_3$, it is also clear that the head $h_1$ may be controlled by raising or lowering the water reservoir and pressure head regulator together as a unit. The screws 33 in Figure 1 serve for this purpose when fine head adjustment is needed.

Notice that the condition $h_2 = h_3$ does not require that the pressure head regulator be at some definite height with respect to the height of the water reservoir. Notice further that the size of the air spaces B and C does not enter into the problem. Finally, notice that no water is supplied by the pressure head regulator; the glass tubing 38 only delivers air.

As water in drop form is deposited or falls onto the test sample 11, a certain portion of the water is absorbed by the test sample or infiltrates the same. Some of the water runs off of the soil, and also the falling drops cause some of the water to splash upon impact with the soil. Both the run-off water and splashing drops carry some soil and are responsible for soil erosion. The run-off water and the splash are collected in the trough which is designated with the numeral 54, and which is defined by the upper end of the infiltration cylinder 12, the lower end of the splash shield 17 and the trough plate 14. The run-off and splash are delivered through the spout 19 to the collector bottle 20. Following a test, that portion of the splash which clings to the splash shield 17 may be scraped or otherwise removed therefrom to recover it.

The method of making the various measurements of the physical properties of the soil sample involves in each case a time determination—that is, the duration of each test or measurement must be accurately timed. The necessity of this will be apparent when it is considered that the standard measurement for run-off is in inches per unit of time (usually hours), that infiltration is measured in inches per hour, and that erosion is measured in tons per acre per hour.

The method also comprises an accurate determination of the quantity of water applied to the test sample per unit of time, and of course the water run-off and erosion materials must be collected and measured. The area of the test sample, of course, must be known in determining the amount of erosion since the measurement for erosion includes an area value.

A substantial number of actual tests or measurements have been made utilizing the method steps inherent in the foregoing description while using apparatus substantially identical to that shown in the drawing. The results of certain of these tests will be set out in a chart hereinafter, and this chart may be described briefly as showing run-off, infiltration, and erosion measurements that were made for a rainfall intensity of approximately four inches per hour during a period of approximately a half hour. The tests were made on three different soil types—namely, Ida, Thurman, and Clarion soils.

| | Applied Rainfall inten., in./hr. | Time Interval | | | | | | Time at end of run (min.) | Total at End of Run |
|---|---|---|---|---|---|---|---|---|---|
| | | 0-5 min. | 5-10 min. | 10-15 min. | 15-20 min. | 20-25 min. | 25 min. to end | | |
| Ida Silt Loam: | | | | | | | | | |
| Run-Off [1] | 3.99 | 0.97 | 2.84 | 3.41 | 3.54 | 3.58 | 3.61 | 30.2 | 1.50 in. |
| Infiltration [2] | 3.99 | 3.02 | 1.15 | 0.58 | 0.45 | 0.41 | 0.38 | 30.2 | 0.50 in. |
| Erosion [3] | 3.99 | 0.81 | 1.46 | 1.33 | 1.11 | 0.99 | 0.91 | 30.2 | 4.34 tons/acre. |
| Thurman Loamy Fine Sand: | | | | | | | | | |
| Run-Off | 4.15 | 0.06 | 0.03 | 0.12 | 0.34 | 0.62 | 1.08 | 29.1 | 0.18 in. |
| Infiltration | 4.15 | 4.09 | 4.12 | 4.04 | 3.82 | 3.54 | 3.07 | 29.1 | 1.84 in. |
| Erosion | 4.15 | 0.02 | 0.02 | 0.02 | 0.03 | 0.073 | 0.22 | 29.1 | 9.5 tons/acre. |
| Clarion Loam: | | | | | | | | | |
| Run-Off | 3.80 | 0.84 | 2.48 | 2.72 | 3.09 | 3.07 | 3.08 | 30.3 | 1.28 in. |
| Infiltration | 3.80 | 2.96 | 1.32 | 1.08 | 0.73 | 0.73 | 0.74 | 30.3 | 0.04 in. |
| Erosion | 3.80 | 0.58 | 1.78 | 1.51 | 1.55 | 1.35 | 0.92 | 30.3 | 4.84 tons/acre. |

[1] Run-Off—inches per hour.
[2] Infiltration—inches per hour.
[3] Erosion—tons solids per acre per hour.

Some results illustrating the use of the equipment in measurement of infiltration, run-off and erosion are presented in two tables. Notice in the captions of the tables that the solid material which is carried into the milk bottle by the run-off water is designated "wash erosion," while the remainder (which must be rinsed from the splash shield and the run-off trough after rainfall has ceased) is designated "splash erosion."

Table 1 shows infiltration, run-off and erosion for a corn-corn-oats-meadow rotation on a Clarion loam, a fertile glacial soil of Iowa. Measurements are made only for (a) the second year corn and (b) oats. A principal effect to observe is the influence of soil wetness on infiltration rate. Comparing rows 1 and 2 of the table and footnote C, one sees that although the wet soil had received only 1.05 inches more of water than the dry soil, the wet soil has had its infiltration reduced from 1.05 to 0.85 inches for the half hour. If the soil had been wetted to field capacity the infiltration would likely have been still less, as is evident from rows 3 and 4 where dry soil accepted 1.36 inches in the half hour and wet soil 0.65 inch. In all four rows of the table, wash erosion yielded only a small part of the total erosion; most of the erosion was of the splash type. Differences in total erosion for wet and dry soil were marked. In dry soil the erosion was about double that for wet soil, the figures for the corn phase being 7.26 and 3.83 tons per acre and for the oat phase 8.17 and 4.42 tons per acre.

Table 2 presents results for comparing the influence, where it exists, of two cropping systems on infiltration, run-off and erosion as measured with the equipment. The cropping systems are corn-oats-meadow, and continuous corn, both being on Edina soil, a planosol of southern Iowa. Notice that the entries, although given for six 5-minute intervals, are expressed on an hourly basis; and that therefore, the results for infiltration and run-off but not for erosion, should add up, except for rounding errors, to 24 inches instead of 2 inches. Entries in Table 2 are not broken down into wash and splash erosions as the method of operation of the equipment does not permit the measurement of splash erosion except at the termination of a run.

One sees in the table that the run-off rate increases for both cropping systems with each successive 5-minute interval, and that correspondingly infiltration rate decreases with each 5-minute interval. Such behavior is well known. The results for wash erosion are not so well known. Wash erosion for both systems starts at a small value (theoretically zero at zero time) and builds up to a maximum value during the 5–10 minute interval; thereafter decreasing rapidly in the next 5 or 10 minutes and then decreasing slowly until the termination of the run. Notice that the decrease in erosion (soil solids) occurs while the run-off rate is building up. The junior inventor, while employed by the United States Geological Survey, has frequently observed a similar situation in streams in the Missouri Basin during and after periods of high rainfall, in which the sediment concentration in the stream reached a peak and decreased before the maximum water discharge was attained.

Four highly significant differences between the two rotations were ascertained by analysis of the data in Table 2. These differences were for the 20–25 minute run-off rate (3.19 vs. 3.61 in. one hour); the 20–25 minute mean infiltration rate (0.80 vs. 0.40 in. one hour); the 15–30 minute means run-off total

[(3.72+3.19+3.28)/3=3.25 vs.
(3.61+3.61+3.66)/3=3.63 in. one hour]

and the 15–30 minute mean infiltration total

[(.72+0.80+0.71)/3=0.74 vs.
(0.40+0.40+0.35)/3=0.38 in. one hour]

The 15–30 minute interval was chosen because, as has been indicated, run-off and correspondingly infiltration changed only slowly in this 15-minute interval.

*Table 1*

[Effect of soil moisture and crop on infiltration, run-off and erosion in a corn-corn-oats-meadow rotation on Clarion loam, as measured for 2 inches of rain applied in one-half hour by the rainfall simulator.]

| Table Row No. | Crop Sampled (see underline) | Initial soil moisture | Inches in One-half hour | | Erosion, tons/acre/½ hr. | | |
|---|---|---|---|---|---|---|---|
| | | | Infil. | Run-off | Total | Splash | Wash |
| 1 | C—C—O—M | dry[a] | 1.05 | 0.95 | 7.26 | 6.60 | 0.66 |
| 2 | C—C—O—M | wet[b] | 0.85 | 1.15 | 3.83 | 3.39 | 0.44 |
| 3 | C—C—O—M | dry[a] | 1.36 | 0.64 | 8.17 | 7.75 | 0.42 |
| 4 | C—C—O—M | wet[c] | 0.65 | 1.35 | 4.42 | 4.00 | 0.42 |

[a] Field dryness (16 percent oven-dry basis).
[b] Wetness is that supplied by the addition of the 1.05 inches of infiltration four hours previously.
[c] Field capacity (25 percent by weight).

*Table 2*

[Run-off, infiltration and wash erosion rates from 2.00 inches of artificial rain applied in one-half hour to the corn phase of a corn-oats-meadow, and of a continuous corn rotation, both rotations having been established four years on an Edina Silt loam soil. Data collected by Donald R. Nielsen.]

| Rotation | Time Interval in Minutes | | | | | |
|---|---|---|---|---|---|---|
| | 0–5' | 5–10' | 10–15' | 15–20' | 20–25' | 25–30' |
| Run-off (in./hr.) | | | | | | |
| C—O—M[a] | 1.04 (0.13) | 2.66 (0.24) | 3.04 (0.12) | 3.26 (0.26) | 3.18 (0.06) | 3.27 (0.07) |
| Cont. Corn[c] | 1.31 (0.15) | 3.19 (0.34) | 3.30 (0.16) | 3.62 (0.13) | 3.62 (0.09) | 3.67 (0.10) |
| Infiltration (in./hr.) | | | | | | |
| C—O—M[a] | 2.93 (0.13) | 1.32 (0.24) | 0.94 (0.12) | 0.71 (0.26) | 0.79 (0.06) | 0.70 (0.07) |
| Cont. Corn[c] | 2.72 (0.15) | 0.84 (0.34) | 0.72 (0.16) | 0.41 (0.13) | 0.41 (0.09) | 0.36 (0.10) |
| Wash Erosion (tons/acre/hr.) | | | | | | |
| C—O—M[d] | 0.89 (0.14) | 1.46 (0.21) | 1.37 (0.18) | 1.34 (0.16) | 1.17 (0.15) | 1.22 (0.13) |
| Cont. Corn[c] | 1.18 (0.06) | 1.76 (0.37) | 1.49 (0.27) | 1.38 (0.23) | 1.33 (0.25) | 1.22 (0.21) |

[a] Each entry in row is average for 7 replicates (infiltration cylinders).
[b] Entries in parentheses are standard errors for the number above. For run-off and infiltration the standard errors are necessarily the same.
[c] Each entry in row is average of 5 replicates.
[d] Each entry in row is average of 6 replicates.

*Table 3*

[Total run-off, infiltration and erosion for the 2 inches of rain applied in the ½ hour for the conditions of Table 2.]

| Rotation | Inches in ½ hour | | Erosion (tons/acre/½ hr.) | | | |
|---|---|---|---|---|---|---|
| | Run-off | Infiltration | Wash | Splash | Total | |
| C—O—M | 1.38 (0.05) [a] | 0.62 (0.05) [a] | 0.62 (0.07) [b] | 3.82 (0.32) [b] | 4.44 (0.30) [b] | |
| Cont. Corn[d] | 1.55 (0.04) | 0.45 (0.04) | 0.69 (0.10) | 3.78 (0.20) | 4.47 (0.14) | |

[a] Average of 7 replicates.
[b] Average of 6 replicates.
[c] Numbers in parentheses are standard deviations of numbers above.
[d] Average of 5 replicates; applies to each entry in row.

While in the foregoing specification an embodiment of the invention has been described in considerable detail as to the apparatus features thereof for the purpose of making a complete disclosure thereof, it will be apparent to those skilled in the art that numerous changes may be made in those details without departing from the spirit and principles of the invention.

We claim:

1. In apparatus of the character described, an infiltration member adapted to be inserted into the ground to define a soil test sample area, a raindrop applicator, means for supporting said applicator a spaced distance above said infiltration member, and means for depositing liquid at a predetermined rate onto said raindrop applicator, said applicator being characterized by releasing liquid so deposited thereon in droplet form for downward travel toward the infiltration member, and means for collecting water and soil from said test sample area overflowing the top of said infiltration member.

2. The apparatus of claim 1 in which said raindrop applicator has a horizontal upper surface upon which liquid is deposited and is provided with a plurality of dispensing tubes flush at their upper ends with the upper surface of the applicator and depending therefrom.

3. In apparatus for measuring physical properties of soil and like material, a hollow infiltration member adapted to be driven into the ground to define an area of a soil test sample, a trough extending perimetrically about said infiltration member for receiving material overflowing the upper end thereof, means for collecting materials received within said trough, a raindrop applicator for receiving water and for releasing the same in droplet form for deposition on a soil test sample defined by said infiltration member, means for supporting said raindrop applicator a spaced distance above said infiltration member and in alignment therewith, a reservoir for supplying water to the raindrop applicator, and means for controlling the delivery of water from said reservoir at a preselected rate to said raindrop applicator.

4. The structure of claim 3 in which pressure head regulator means are provided to maintain a constant delivery rate from said reservoir to maintain simultaneously a constant delivery rate of raindrops at a preselected value.

5. The structure of claim 3 in which a splash shield is provided about said trough and about the upper end of said infiltration member and extending upwardly therefrom.

6. The structure of claim 5 in which a wind shield extends upwardly from said splash shield and to said raindrop applicator.

7. The apparatus of claim 3 in which said raindrop applicator comprises a horizontal upper surface upon which liquid is deposited and is provided with a plurality of dispensing tubes flush at their upper ends with the upper surface of the applicator and depending therefrom.

8. The apparatus of claim 7 in which a wire depends through each of said tubes and functions to cause liquid moving therethrough to be discharged in drop form.

References Cited in the file of this patent

UNITED STATES PATENTS

| | | |
|---|---|---|
| 966,078 | Bowman | Aug. 2, 1910 |
| 1,538,730 | Obersohn et al. | May 19, 1925 |
| 2,409,469 | Bravo | Oct. 15, 1946 |
| 2,697,286 | Miller | Dec. 21, 1954 |

OTHER REFERENCES

"Soil Physics" by L. D. Baver, 2nd edition, 1948, pages 373–380.